(12) United States Patent
Cansizlar

(10) Patent No.: US 8,689,189 B1
(45) Date of Patent: *Apr. 1, 2014

(54) SYSTEMS AND METHODS FOR TESTING WIDGETS

(75) Inventor: Kemal Oral Cansizlar, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 47 days.

This patent is subject to a terminal disclaimer.

(21) Appl. No.: 13/488,077

(22) Filed: Jun. 4, 2012

Related U.S. Application Data

(63) Continuation of application No. 12/032,000, filed on Feb. 15, 2008, now Pat. No. 8,196,112.

(51) Int. Cl.
*G06F 9/44* (2006.01)

(52) U.S. Cl.
USPC .......................... 717/126; 717/124; 717/130

(58) Field of Classification Search
USPC .................................................. 717/124–131
See application file for complete search history.

(56) References Cited

U.S. PATENT DOCUMENTS

| | | | |
|---|---|---|---|
| 6,519,766 B1 * | 2/2003 | Barritz et al. | 717/130 |
| 6,662,312 B1 | 12/2003 | Keller et al. | |
| 6,681,387 B1 | 1/2004 | Hwu et al. | |
| 6,698,013 B1 * | 2/2004 | Bertero et al. | 717/127 |
| 7,100,150 B2 | 8/2006 | Polk | |
| 7,137,100 B2 | 11/2006 | Iborra et al. | |
| 7,340,720 B2 | 3/2008 | Halstead et al. | |
| 7,415,698 B2 | 8/2008 | Soroker et al. | |
| 7,433,852 B1 * | 10/2008 | Bertrand et al. | 706/45 |
| 7,493,594 B2 | 2/2009 | Shenfield et al. | |
| 7,546,543 B2 | 6/2009 | Louch et al. | |
| 7,676,294 B2 * | 3/2010 | Baier et al. | 700/108 |
| 7,721,254 B2 | 5/2010 | Relyea et al. | |
| 7,840,947 B2 * | 11/2010 | Lev et al. | 717/124 |
| 7,941,438 B2 | 5/2011 | Molina-Moreno et al. | |
| 7,941,786 B2 | 5/2011 | Scott et al. | |
| 7,979,849 B2 | 7/2011 | Feldstein et al. | |
| 8,001,481 B2 | 8/2011 | Chakra et al. | |
| 8,001,539 B2 * | 8/2011 | Mitchell | 717/158 |

(Continued)

OTHER PUBLICATIONS

Tang et al, "A Debug Probe for Concurrently Debugging Multiple Embedded Cores and Inter-Core Transactions in NoC-Based Systems", IEEE, pp. 416-421, 2008.*

(Continued)

*Primary Examiner* — Anil Khatri
(74) *Attorney, Agent, or Firm* — Kilpatrick Townsend & Stockton LLP

(57) ABSTRACT

Widgets or other code modules for applications written in structured languages such as HTML can be tested advantageously by separating the extraction and validation logic. To test the functionality of a widget in response to an action, widget features of interest are identified. Context and feature nodes for these features are extracted from a page tree structure to generate a property vector that is representative of the state of the widget. After performing the action, context nodes for the features are attached to the new page tree for the newly loaded page, and an observed property vector is generated that represents the state of the widget after the action. The previous property vector is used with updated state information to generate an expected property vector. The observed property vector is compared with the expected property vector, and if the vectors match the validation is claimed to be successful.

19 Claims, 10 Drawing Sheets

(56) References Cited

U.S. PATENT DOCUMENTS

| | | | |
|---|---|---|---|
| 8,006,224 B2 | 8/2011 | Bateman et al. | |
| 8,020,151 B2 | 9/2011 | Allen et al. | |
| 8,141,058 B2 * | 3/2012 | Berg et al. | 717/131 |
| 8,166,459 B2 * | 4/2012 | Suenbuel | 717/124 |
| 8,352,495 B2 * | 1/2013 | LaRowe et al. | 707/780 |
| 8,365,147 B2 * | 1/2013 | Grechanik et al. | 717/124 |
| 8,365,149 B2 * | 1/2013 | Frank et al. | 717/125 |
| 8,370,362 B2 * | 2/2013 | Szabo | 707/739 |
| 8,443,341 B2 * | 5/2013 | Berg et al. | 717/131 |
| 8,453,120 B2 * | 5/2013 | Ceze et al. | 717/127 |

OTHER PUBLICATIONS

Jacobi et al, "Transactional Memory Architecture and Implementation for IBM System Z", IEEE, 25-26, 2012.*

McKechnie et al, "Debugging FPGA-based Packet Processing Systems through Transaction-level Communication-centric Monitoring", ACM, pp. 126-136, 2009.*

DZyulkyarov et al, "Debugging Programs that use Atomic Blocks and Transactional Memory" ACM, pp. 57-66, 2010.*

Bezemer et al., "Automated Security Testing of Web Widget Interactions," *ACM ESEC*, pp. 81-90, 2009.

Deinert et al., "Introducing Widget Based IMS Client Applications," Springer Science, *Mobile Netw Appl* 15, pp. 845-852, 2010.

Leung et al., "A CSCW Framework for the Flexible Coupling of Groupware Widgets," *IEEE*, pp. 1-12, 1999.

Shirogane et al., "Correspondence Validation Method for GUI Operations and Scenarios by Operation History Analysis," *ACM IUI*, pp. 257-266, 2008.

* cited by examiner

```
<div id="ChatWidget">
  <div class="ContentFrame" id="chatUserContent">
    <div class="TitleText" id="widgetTitle">
      <span>CHAT WITH OTHERS ABOUT THIS PRODUCT</span>
    </div>
    <form id="ChatForm" name="chatForm">
    <div id="ChatSessionList" class="sanssmallblack">
          <span style="BORDER: thin solid"> <A HREF="#"
ONCLICK="switchTabs(1)">MAIN</A> </span>
          <span style="BORDER: thin solid"> <A HREF="#"
ONCLICK="switchTabs(2)">USER X</A> </span>
          <span style="BORDER: thin solid"> <A HREF="#"
ONCLICK="switchTabs()">USER Y</A> </span>
    </div>
    <div id="ChatDisplay" class="sanssmallblack">
      <font color="red"><pre class="inlineMsg">User A has entered room</pre></
font>
      <br>
      <font color="red"><pre class="inlineMsg">User X has entered room</pre></
font>
      <br>
      <font color="blue"><b>User A:</b> <pre class="inlineMsg">How is the
battery life on this laptop?</pre></font>
      <br>
      <font color="green"><b>User X:</b> <pre class="inlineMsg">Mine seems
to last about 2 hours on a full charge.</pre></font>
      <br>
      <font color="black"><b>User Y:</b> <pre class="inlineMsg">Really? I
only seem to get about 45 minutes worth!</pre></font>
      <br>
      <font color="black"><b>YOU:</b> <pre class="inlineMsg">What are you
using it for, Y?</pre></font>
      <br>
      <font color="black"><b>User Y:</b> <pre class="inlineMsg">Gaming,
mostly ...</pre></font>
      <br>
      <font color="green"><b>User X:</b> <pre class="inlineMsg">That
explains the difference then ... I use mine mostly for word processing.</pre></
font>
      <br>
      </div>
    <div style="display: block;" id="ChatActivity"
class="sanssmallblackbold"><span>Activity: User Y is typing ...</span></div>
    <div id="ChatMsg" class="sanssmallblack">
      <textarea id="msgText" name="msgText" wrap="virtual"
onkeydown="captureEnter(this, event);"></textarea>
      <span>
         <button id="sendButton" class="sendButtonClass" tabindex="4"
onclick="return bttnOnClick(this, event);" ondblclick="return
bttnOnDblClick(this, event);">
             <span id="sendButtonText" class="sendButtonTextClass">Send</span>
         </button>
      </span>
    </div>
    </form>
  </div>
</div>
```

FIG. 4

```
<DIV>
  |--<DIV>
  |  |--<DIV>
  |  |  |--<SPAN>
  |  |  |  |--'CHAT WITH OTHERS ABOUT THIS PRODUCT'
  |  |  |  </SPAN>
  |  |  </DIV>
  |  |--<FORM>
  |  |  |--<DIV>
  |  |  |  |--<SPAN>
  |  |  |  |  --<A>
  |  |  |  |    |--'MAIN'
  |  |  |  |    </A>
  |  |  |  |  </SPAN>
  |  |  |  |--<SPAN>
  |  |  |  |  --<A>
  |  |  |  |    |--'USER X'
  |  |  |  |    </A>
  |  |  |  |  </SPAN>
  |  |  |  |--<SPAN>
  |  |  |  |  --<A>
  |  |  |  |    |--'USER Y'
  |  |  |  |    </A>
  |  |  |  |  </SPAN>
  |  |  |  </DIV>
  |  |  |--<DIV>
  |  |  |  |--<FONT>
  |  |  |  |  --<PRE>
  |  |  |  |    |--'User A has entered room'
  |  |  |  |    </PRE>
  |  |  |  |  </FONT>
  |  |  |  |--<BR>
  |  |  |  |  </BR>
  |  |  |  |--<FONT>
  |  |  |  |  --<PRE>
  |  |  |  |    |--'User X has entered room'
  |  |  |  |    </PRE>
  |  |  |  |  </FONT>
  |  |  |  |--<BR>
  |  |  |  |  </BR>
  |  |  |  |--<FONT>
  |  |  |  |  --<B>
  |  |  |  |    |--'User A:'
  |  |  |  |    </B>
  |  |  |  |  --<PRE>
  |  |  |  |    |--'How is the battery life on this laptop?'
  |  |  |  |    </PRE>
  |  |  |  |  </FONT>
  |  |  |  |--<BR>
  |  |  |  |  </BR>
  |  |  |  |--<FONT>
  |  |  |  |  --<B>
  |  |  |  |    |--'User X:'
  |  |  |  |    </B>
  |  |  |  |  --<PRE>
  |  |  |  |    |--'Mine seems to last about 2 hours on a full charge.'
  |  |  |  |    </PRE>
  |  |  |  |  </FONT>
  |  |  |  |--<BR>
  |  |  |  |  </BR>
  |  |  |  |
  |  |  |  |--' '
  |  |  |  |
  |  |  |  |
```

FIG. 5

```
<DIV> (Context Node)
|- <B> (Context Node)
|   |- 'User A:' (Property)
|   </B>
|- <PRE> (Context Node)
|     |- 'How is the battery life on this laptop?' (Property)
|   </PRE>
|- <B> (Context Node)
|   |- 'User X:' (Property)
|   </B>
|- <PRE> (Context Node)
|     |- 'Mine seems to last about 2 hours on full charge.'
|   </PRE>
...
```

SYSTEMS AND METHODS FOR TESTING WIDGETS

CROSS-REFERENCE TO RELATED APPLICATIONS

This is a continuation application of parent U.S. patent application Ser. No. 12/032,000 entitled "SYSTEMS AND METHODS FOR TESTING WIDGETS," which is hereby incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

The present disclosure relates generally to the testing and development of software code, and in particular to the testing of widgets or other such code modules having a structured or hierarchical format.

With the increasing use of an object-oriented paradigm in Web programming, and other such structured languages, approaches to testing and debugging features on a page, display, or interface for an application or code module have changed to address such structures. For example, a Web page might include a number of widgets that can be displayed at any given time. In this context, a widget is a chunk or portion of Hypertext Markup Language (HTML) code, for example, that is embedded into a Web page, and which can function independently of any other components or widgets on that Web page, similar to an Object. Widgets can be thought of as self-packaged Web applications, or self-contained code modules, and are often interactive. When a Web page is loaded, the code for that page also will be loaded. As is known in the art, the HTML, Extensible Markup Language (XML), or other such code for the page will be structured with a series of hierarchical tags and values that can be interpreted by an appropriate application such as a Web browser or User Interface (UI).

The code can be parsed into a Document Object Model (DOM) tree by the browser or another application. A DOM tree includes a hierarchy of nodes for a page, interface, or display, in which a parent node is generally considered as enveloping any child node in the tree. In an example of Web UI Test Automation, node types such as element nodes and text nodes are of particular concern. An element DOM node generally acts as a container of text value nodes (e.g., a parent of a text node, like tags FONT or SPAN), and can be considered as any non-textual component that decorates a web or application page (e.g., clickable links, images, buttons, etc.). Text value DOM nodes include any type of node with a text value, such as a text node (i.e., displayable strings on the website), attribute node (i.e., an attribute of an element DOM node, such as HREF or ID), etc. These nodes are descendants of element nodes and are usually found at the fringes of the hierarchy, and thus are obtained via traversing through their parent element nodes.

In order to ensure proper functionality of widgets or other code modules, such as may be included on a single page, test cases are typically generated and executed to validate various aspects of the code modules. While the functionality can be tested manually through user observation, it is desirable to automate the test cases such that functionality can be tested at any time, using a quick and easy process that can be executed frequently, such as after each incremental change to the code, with little overhead. Test automation can thus be run unattended and can simulate actions of a user.

Current approaches to test automation for such purposes are not ideal, however, as it requires careful designing of a test automation framework to create test automation scripts that are reusable, or that are flexible to be adapted to different testing situations. Oftentimes the test automation scripts have state information hard-coded haphazardly, or have code that is at least partially re-written, for each test case. For example, the user interface features available over the Web are becoming evermore complex, resulting in the number of corresponding test cases increasing exponentially. Further, technologies such as AJAX (Asynchronous JavaScript® and XML) are commonly used today for Web development, which provide for display updates in a Web environment without the need to unload the current page and load another page. Such an approach results in significant manipulation of the structure of the page, with structures such as element nodes and text nodes being updated upon an event or user action in place. Such techniques further increase the number of test automation scripts needed. The need for a good coverage of test cases not only takes a significant amount of time and effort to generate, but becomes difficult and time consuming to maintain.

BRIEF DESCRIPTION OF THE DRAWINGS

Various embodiments in accordance with the present disclosure will be described with reference to the drawings, in which:

FIG. 4 illustrates example HTML code for the chat widget of FIG. 3;

FIG. 5 illustrates a portion of a DOM tree for the HTML of FIG. 4;

DETAILED DESCRIPTION

Systems and methods in accordance with various embodiments of the present disclosure may overcome one or more the aforementioned and other deficiencies experienced in conventional approaches to testing in a structured code environment. Various embodiments take advantage of a testing design, pattern, and/or framework that is useful in testing widgets and other such structured code modules, and can help to automate such testing. Since an object such as a page, display, or interface might contain many such modules or widgets, a hyperstructure or hyper-tree can be generated that provides for feature extraction and that is targeted to the widget(s) and feature(s) of interest. Validation can then be run on property vectors obtained from these hyperstructures. Among many other potential benefits, such an approach separates the data acquisition logic from the data verification, providing a flexible, extensible, and scalable approach that can be applied advantageously in many different situations.

Figure 1:
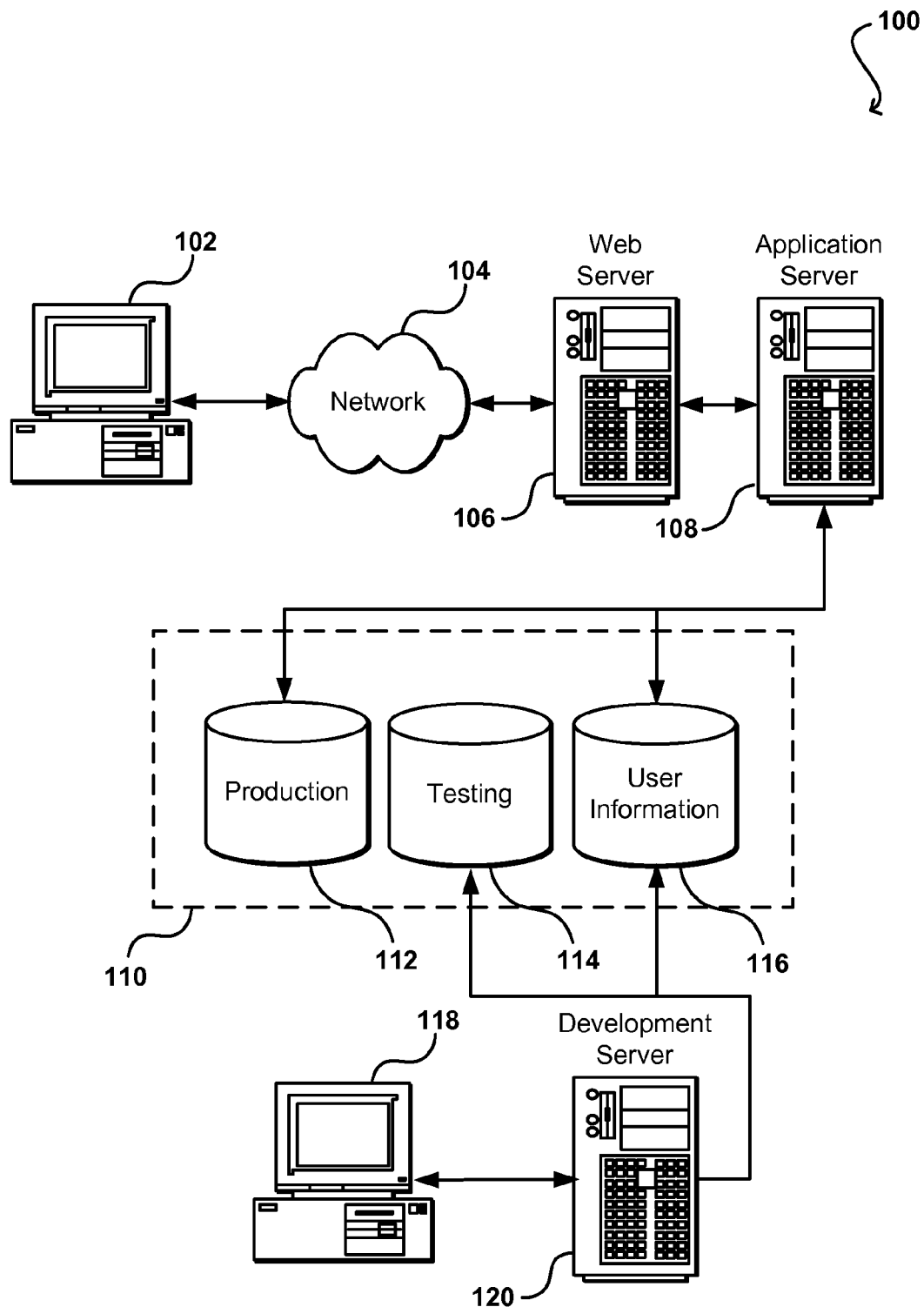
FIG. 1 illustrates a system configuration that can be used in accordance with one embodiment.

FIG. 1 illustrates an example of an environment 100 for implementing aspects in accordance with various embodiments. As will be appreciated, different environments may be used, as appropriate, to implement various embodiments. The environment 100 shown includes both a testing portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

The environment also includes a development and/or testing side, which includes a user device 118 allowing a user such as a developer, administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example.

The illustrative environment further includes at least one application server 108 and a data store 110. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML for at least one Web page using hypertext transfer protocols. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Aspects of the various embodiments can be utilized on the production side or the development side. These aspects also can be used in other environments, where there may not be such a separation, or where there may be other portions such as a dedicated test server (not shown) or other such devices.

Arrangements for testing development and production code are known in the art and will not be discussed herein in detail.

Figure 2:
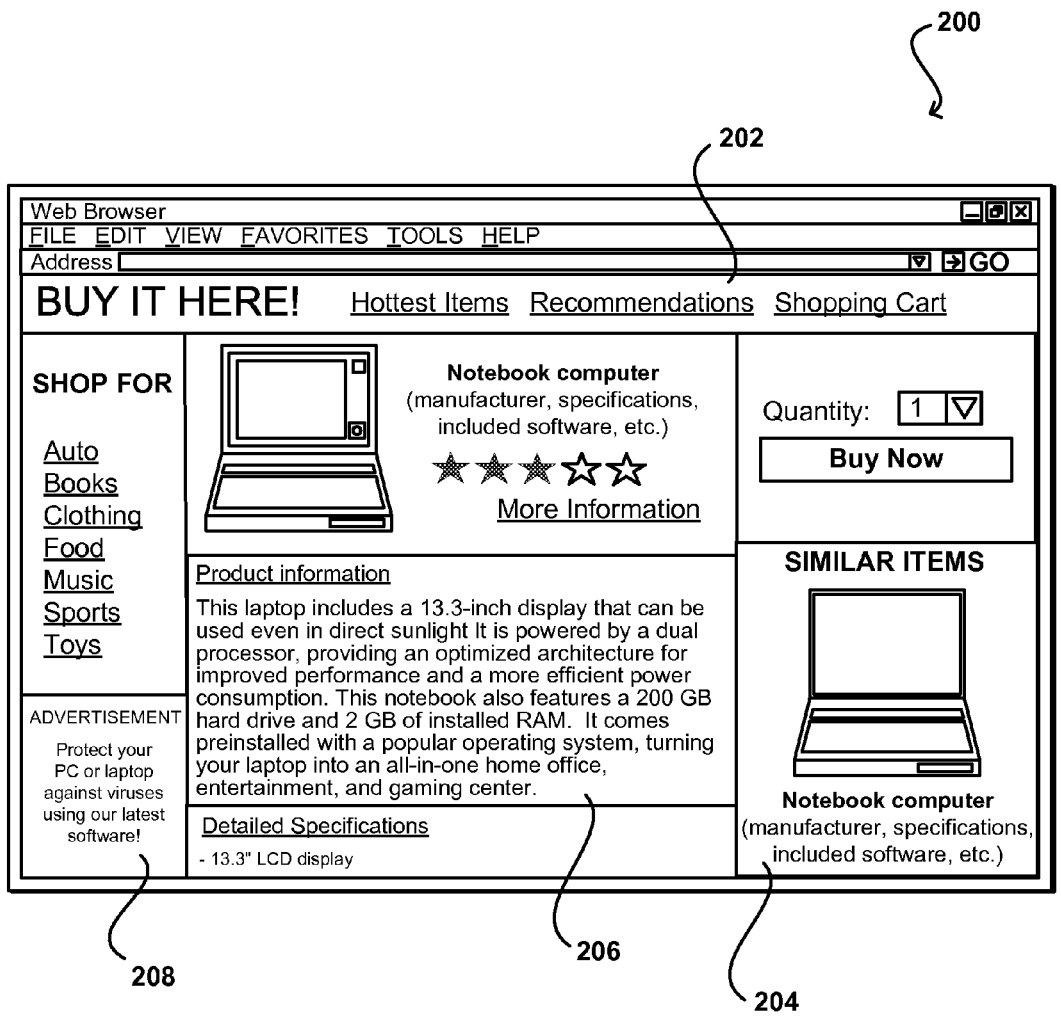
FIG. 2 illustrates an example display of a page containing widgets that can be tested in accordance with one embodiment.

As discussed above, an application or code module running on an application server, development server, or other host machine can include or provide at least one page, display, or interface that includes one or more widgets, objects, or code modules. For example, FIG. 2 illustrates a graphical user interface (GUI) window 200 for a browser application on a client device, here displaying a Web page in which a user is able to view information relating to an item of interest, in this case a particular laptop. As can be seen, this particular page includes a number of widgets that are displayed to a user, such as a navigation widget 202 which allows a user to navigate to other portions of the site, a similar items widget 204 that displays other items determined to be similar to the item being viewed, an advertisement widget 208 that contains an advertisement to be displayed along with the item, and a product information widget 206 that displays information about the item, among several other widgets. As known in the art, each of these widgets typically has an individual code module associated therewith, and the widgets are only assembled or aggregated into the page at the time of rendering of the page in response to a request from a user or application, for example. The code for each widget may not only be developed separately, but may also be stored separately (even remotely) and may come from multiple sources including third parties. For example, a provider might rent out space on the page to a third party, who will provide one of the widgets or at least content for one of the widgets.

Figure 3:
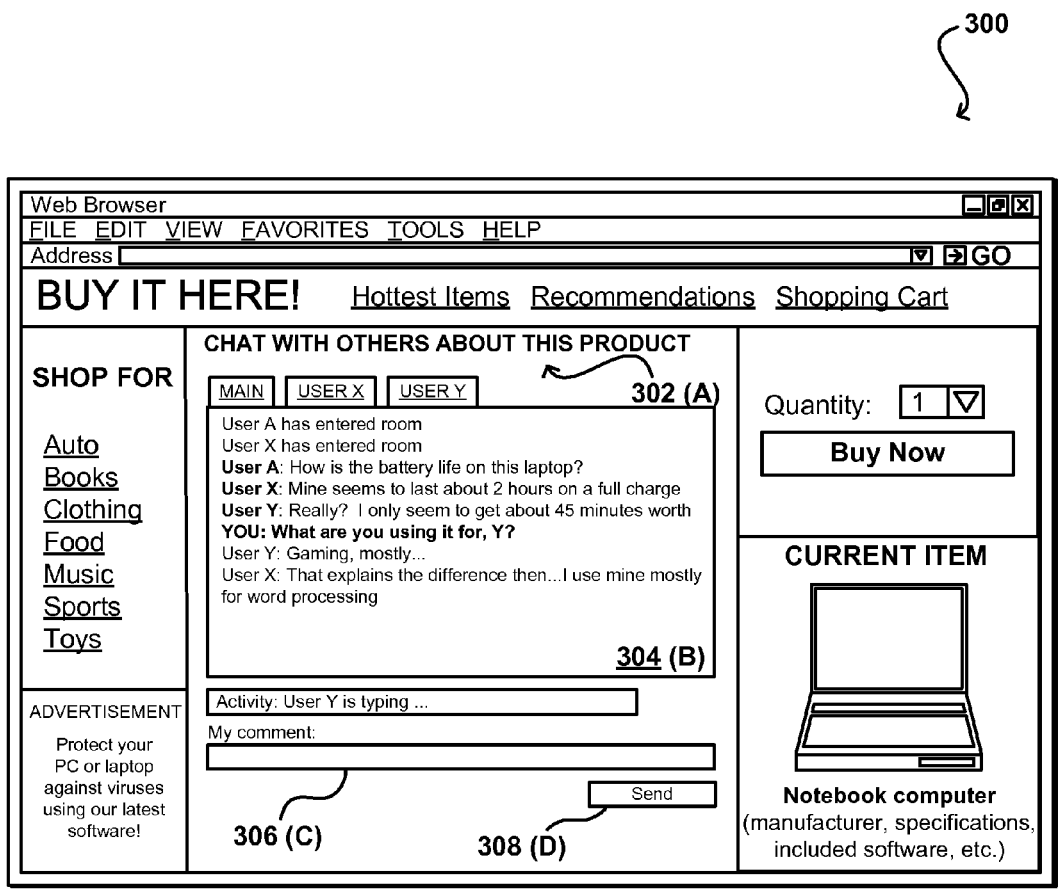
FIG. 3 illustrates another example display of a page containing widgets that can be tested in accordance with one embodiment.

FIG. 3 illustrates another example page 300 that contains a chat widget 302 that will be used to describe various embodiments. The chat widget comprises several features, including a title 302, a chat history window 304 that contains multiple tabs for multiple filters or instances, an activity dynamic label text, a chat entry field 306, and a send button 308. Each of these features corresponds to a tag in the code, and as there is a one-to-one mapping between a tag and a context node, each feature thus also corresponds to a context node. A context node in a Web context is the DOM node for an HTML tag, and functions similarly for other languages and environments. Context nodes are non-text-value nodes that typically serve two purposes: context nodes represent components on a page that can be acted upon (e.g., text links, submit buttons) or can act solely as containers for feature nodes (e.g., FONT or B tags). Feature nodes, on the other hand, are text value nodes, usually corresponding to a static text that can be rendered on the page or a value internal to the code, the text value of that feature node being referred to herein as a feature value. The context nodes also can have associated therewith a context presence value, indicating whether the context node is present in the page tree structure. The feature values and context presence information are collectively referred to herein as "property values" of a widget. The property values can be combined to generate a property vector for a state of a widget as discussed elsewhere herein.

FIG. 4 shows example HTML code 400 for just the chat widget portion of the display. As can be seen, even if the portion of the HTML for the page can be isolated, there still will be much information and many tags that are not of importance for the test. For example, many tags relate to the font color or a line break in the text of the display, which might not be of importance for various functionality tests. Similarly, FIG. 5 illustrates only a portion of a DOM tree 500 that corresponds to the chat widget. As known in the art, a DOM tree model can be considered a de facto object notation for a given HTML. Again, even if the portion of the DOM tree for the entire page can be filtered such that the chat widget portion can be isolated, as illustrated, there still are a large number of nodes that are not of particular interest for the test.

Systems and methods in accordance with various embodiments provide for a hyperstructure, or a hyper-tree of the DOM tree for the page, that corresponds to the features of interest for a widget. This widget-specific hyperstructure will be referred to herein as a widget tree, which contains a subset of the nodes of the overall page tree and preserves the relative positioning between the nodes. As discussed above, each feature of a widget corresponds to a context node in the page tree. By identifying the context nodes that correspond to the features of interest, those context nodes and any corresponding feature nodes can be extracted to create a DOM hyper-tree that consists only of the relevant nodes but maintains the appropriate hierarchical structure and relative ordering. It should be mentioned that this is referred to as a hyper-tree because the hyper-tree contains nodes selected from the overall page tree and maintains their hierarchical structure and relative ordering, but the tree typically will not match up exactly with any particular portion of the page tree as the page tree will have many other nodes interspersed therebetween. While the overall structure is referred to as a page tree for convenience, it should be noted that the structure need not be for a page but could be for any appropriate interface, display, etc. Similarly, the term "widget tree" should not be viewed as limited solely to widgets, but can include a tree for any appropriate code module or portion that can be visualized with a similar structure.

Figures 6, 7:
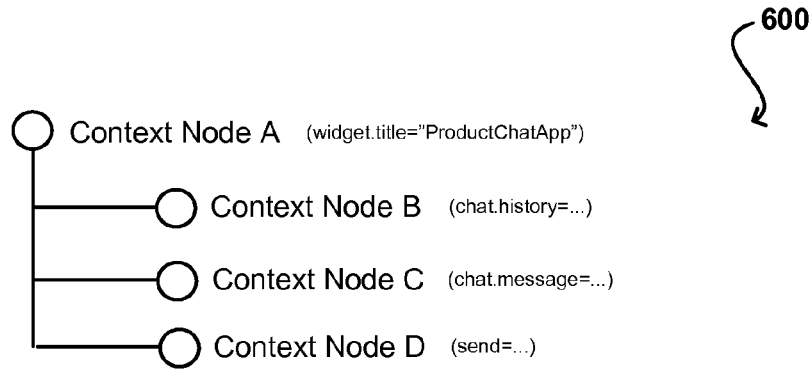
FIG. 6 illustrates a DOM hyperstructure approach for the DOM tree of FIG. 5 that can be used in accordance with one embodiment.
FIG. 7 illustrates an example DOM widget tree using the approach of FIG. 6.

In this example, the context nodes of interest are context node A, which corresponds to the title feature 302 of the chat widget in FIG. 3, context node B, which corresponds to the chat history window 304, context node C, which corresponds to the chat entry field 306, and context node D, which corresponds to the send button feature 308. As discussed, it is desirable to be able to create a hyperstructure that contains only these features in the proper hierarchical structure. FIG. 6 illustrates an example of such a general structure 600, where context nodes B, C, and D are children of context node A, which here is the widget title and identifies the particular widget of interest. FIG. 7 illustrates an example of a hyperstructure 700 corresponding to the DOM tree of FIG. 5, showing that such a hyperstructure can contain only context nodes and feature nodes for identified features of interest, with the nodes following the hierarchy as set forth in the DOM tree. Each widget has a pre-defined structure, so even though the widget can be instantiated as part of different sessions, each instance of the widget will have that pre-defined structure and only the state will change. The context node portion thus is usually applicable to all instances of a widget, with the state or feature values changing between sessions. It should be noted that, the context node portion also can be dynamic, such as where switching between tabs in the chat history window of the chat widget results in replacing the context node that contains the currently displayed chat history with a context node that contains the desired chat history corresponding to the selected tab. It also should be understood that widgets can be embedded within other widgets, such that in some cases a feature can actually correspond to another widget.

As discussed above, the chat widget in this example is a self-contained widget to be included in a Web page that typically will be owned and maintained by a particular development team. The widget is an independent piece of code that can be embedded into the page upon rendering or at another such appropriate time. In the example chat widget, a user can enter a chat message into the chat field 306 and hit the send button 308. This action will cause the chat message to be submitted to a chat server (or service), and will cause the display in the chat history field 304 to be updated. The chat history field also can have tabs that allow the user to view only chat messages with a particular user.

When using such a chat widget, for example, there are several things that might be desirable to test. For example, triggering an action by selecting the send button as described above should cause the chat message to disappear from the chat field and appear properly, with the proper user designation, in the chat history field. Also, if the user refreshes or reloads the page, or opens a new window including that page, it is desirable to ensure that the correct and present state of the widget is reflected and that the proper information is displayed. If a user resizes a window, it is desirable to ensure that the proper information is displayed in a proper fashion for that size. It also could be the case that multiple pages, applications, or other such entities might utilize the chat widget. It is desirable to ensure that the proper state and information is displayed in the other entity as well.

Because there is such a large number of cases where a widget may need to be tested, a widget tree can be used to create a property vector that is specific to the property values of the widget to be tested, as such a property vector can be used for validation in any of these situations. It therefore is beneficial to separate the extraction and validation phases, so that the extracted features and resultant property vector(s) can be used for any appropriate and subsequent validation.

Figure 8:
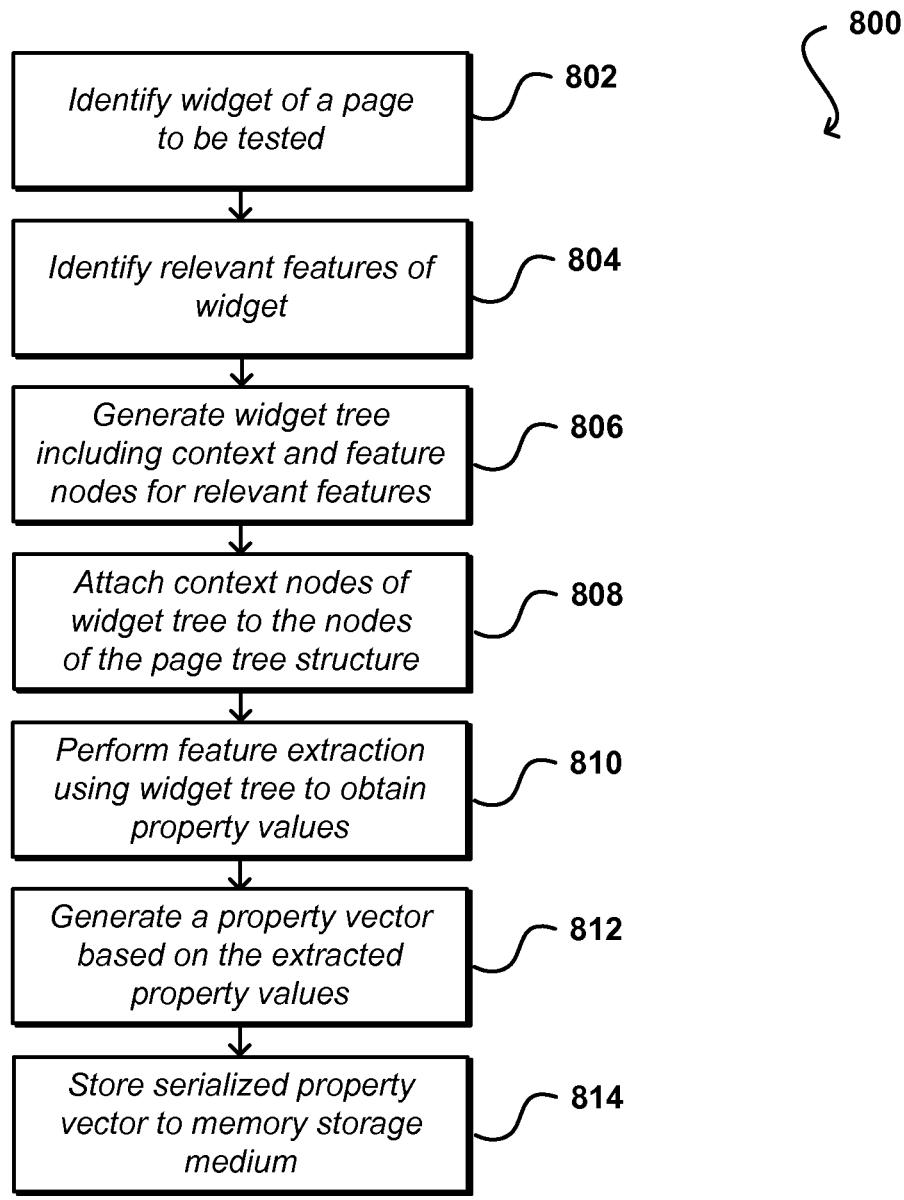
FIG. 8 illustrates a method of extracting features and generating a property vector that can be used in accordance with one embodiment.

FIG. 8 illustrates an example method 800 for extracting features and creating a property vector that can be used in accordance with one embodiment. In this example the chat widget of a Web page will be used for discussion purposes, but it should be understood as discussed elsewhere herein that such a process can be used with any appropriate page, display, or window for any structured language, or language containing tags, nodes, or other such elements. Further, any widget, module, or appropriate piece of code can be tested using such a process, and extracted feature values and context presence information can be stored in ways other than property vectors, such as in arrays, tables, or other such ways that allow feature values to easily be compared as discussed herein.

In order to identify the widget and identify the context nodes and feature nodes in one embodiment, the page is fetched and/or loaded, and parsed into a DOM Tree, possibly by using a tool, such as a Web browser, or library, such as WWW::Mechanize Perl module or any other tool capable of loading and parsing HTML for a page and manipulating the features contained therein.

In such a process, a widget of a page to be tested is identified 802. The widget in one example is identified by a tester who generates a test plan or test case, which includes a workflow that involves loading a particular page containing the identified widget, performing an action affecting the widget, and verifying the functionality of the widget. The tester can be any appropriate user, such as a test engineer, developer, etc. As discussed elsewhere herein, the action can involve any appropriate activity, such as reloading or refreshing the page, resizing the page, performing a function or operation on the page, performing a function or operation on the widget, and so on. The test case can involve a series of automated interactions with the widget, such as where the test script is coded to resize the window, there is a validation, then text is entered into a text field and submitted, there is another validation, etc.

In the example used for discussion, the chat widget is identified as being of interest for testing, and the features of the widget to be tested also are identified 804. In the present example, the tester would specify the chat title, the chat history window, the chat field, and the send button as being of interest. The tester sets up these selections initially and incorporates them into the Test Plan. A test plan typically will include a set of test cases, each of which may contain preconditions, goals, and series of actions that lead to the goal, for the purpose of exercising and/or validating the functionality of the application under test (AUT). Manual validation thus can be replaced by a piece of code referred to as test automation.

Once the widget of interest and the features of interest are identified, the DOM tree for the page is traversed to locate the context nodes that contain the identified features. The context nodes are then used to extract any feature nodes that correspond to the features of interest. Methods for parsing and extracting elements from a file are known in the art and will not be discussed herein in detail. It also should be mentioned that a DOM tree is merely an example of a hierarchical structure for a page, and that any appropriate tree or structured file can be used as would be apparent in light of the teachings and suggestions contained herein.

Once the context nodes and feature nodes are extracted from the DOM tree, a widget tree is generated that includes only the context nodes and feature nodes necessary or useful for testing 806. For example, a tester can identify context nodes A, B, C, and D, such as is illustrated in FIG. 3, which would result in a hyper-tree structure such as is shown generically in FIG. 6. Once identified, the appropriate software will extract the relevant context and feature nodes and generate a widget tree such as the one shown in FIG. 7. This widget tree is a hyper-tree generated from the overall page structure for the page (or at least the overall widget structure for the widget). Since the HTML code for the widget in this example is comprised of many more elements, it is desirable to simply generate a "hyper-structure" which does not include superfluous details and only includes the information of interest. The resulting tree is still a DOM Tree, preserving relative positioning between nodes (although, does not necessarily represent a valid HTML) such that the widget tree still can be traversed by any DOM API.

Once the widget tree is generated, the tree is stored in resident memory for use in extracting the property values. With the widget tree and the page tree both in memory, the context nodes of the widget tree are attached to the corresponding nodes of the page tree 808. Attachment can be part of the feature extraction process. An attachment process is needed since the context nodes of a page tree will be assigned certain memory addresses upon a page load, but these memory addresses typically will be reassigned each time the page is reloaded, or when a new page is opened that contains that widget. Thus, the context nodes may have different memory addresses, such that it typically will be necessary to attach the context nodes to the DOM nodes each time the page is loaded. When that page is unloaded, the context nodes typically will be detached as there is no longer any interest in that instance of the page.

It should be noted that in this embodiment the direction of the attachment process is always from a widget tree to a page tree. Before the attachment, the widget tree is in the form of a feature specification. Once attached, the widget tree becomes a traversable hyper-tree, as there are now pointers to the context nodes of the target page. It is important to clarify that a new DOM tree is not created, but rather pointers are established that correspond to a "subset" of the page tree. The detachment process will simply assign null values to the context nodes of the widget tree.

After the attachment process, the feature extraction process follows. The feature nodes are extracted by traversing the context nodes that contain the feature nodes. The feature values are obtained from these feature nodes, which should evaluate to text values. These feature values are then incorporated into the property vector. If the test case asks for the validation of certain context nodes (e.g. presence of a button element), the context node presence information should also be extracted from the widget tree. Such presence information can be uniquely derived from the context node that is extracted (e.g. the node name). An empty presence information will indicate the absence of that context node. The feature extraction thus obtains the feature values and context node presence information for the identified features 810. This information can then be stored inside an associative array, indexed by the context node names and feature node names, for later reference.

Feature extraction in accordance with one embodiment utilizes XPath expressions, as they are an intuitive, and a common way of querying any given DOM Tree. In explaining feature extraction on widget trees with respect to DOM trees, it should be understood that element nodes are referred to as context nodes in the present description, and values contained in feature nodes are referred to as feature values in the hypertree structure for the widget. This example is presented in a Perl-like pseudo-code for ease of understanding. Before extraction, the widget tree is simply a feature specification as shown in the pseudo-code example below. A feature specification, actually a widget tree specification, typically includes the minimal information necessary for feature extraction. There is an entry in the feature specification for all feature nodes and context nodes required for the test automation. There is also a mapping from a feature or context node to a locator query or routine that will be used for locating and extracting that node. The proposed specification comprises two hashes, one for context nodes and one for feature nodes. The mappings for these nodes include the parent context node and a locator query or routine which will be evaluated in the given context node. An algorithm to extract the features from a feature specification could be written in various ways, as should be apparent from the teachings and suggestions contained herein. For the aforementioned chat widget, the feature specification can look like the following:

```
ContextNodeSpecHash = (
    'widgetRoot' => [ '#document', '//div[@id="ChatWidget"]' ],
    'divContentFrame' => [ 'widgetRoot',
'./div[@id="chatUserContent"]' ],
    'spanTitle' => [ 'divContentFrame', './div/span' ],
    'formChat' => [ 'divContentFrame', './form[@id="ChatForm"]' ],
    'spanChatSessions' => [ 'formChat',
'./div[@id="ChatSessionList"]/span' ],
    'divChatDisplay' => [ 'formChat', './div[@id="ChatDisplay"]' ],
    'preChatMessages' => [ 'chatDisplayDiv', './font/pre' ],
    'spanChatActivity' => [ 'formChat',
'./div[@id="ChatActivity"]/span' ],
    'divChatMsg' => [ 'formChat', './div[@id="ChatMsg"]' ],
    'textareaMsgText' => [ 'divChatMsg', './textarea[@id="msgText"]'
],
    'buttonSend' => [ 'divChatMsg', './span/button[@id="sendButton"]' ]
],
);
FeatureSpecHash = (
    'widgetTitle' => [ 'spanTitle', './text( )' ],
    'chatSessionLinks'      => [ 'spanChatSessions', './a/@href' ],
    'chatSessionTexts'      => [ 'spanChatSessions', './a/text( )' ],
    'chatHistoryTexts'      => [ 'preChatMessages', './text( )' ],
    'chatActivityText'      => [ 'spanChatActivity', './text( )' ],
    'buttonSendText' => [ 'buttonSend', './span/text( )' ]
);
```

The specification hashes consist of a key (e.g., a context node name in ContextNodeHash, a feature name in Feature-SpecHash) and a value of array. For the ContextNodeHash, the first array value is the name of the context node that is an ascendant (e.g., not necessarily an immediate parent) context node. The second array value is the XPath expression that is run in the context of the specified ascendant context node to retrieve the current context node. For the FeatureSpecHash, the first array element is the context node that embodies the feature. The second array element is the locator query in the form of an XPath expression that is run in the context of the specified ascendant context node to extract the feature value that is of interest. Reasons for keeping context nodes and feature nodes in separate hashes will be discussed later herein.

It can be noted that there are numerous ways of defining these hashes, which will produce the same result but may do so through a different combination of queries. XPath expressions provide a flexible means to query the DOM Tree, as well as to validate the DOM structure (e.g., a null result may mean the observed structure did not match the given path expression, thus causing a failure). The algorithm to extract such values can be implemented in any programming language with XPath and DOM support. The implementation could be recursive or iterative. The given example is a very simplified version of a real-world Web application, and some edge cases are omitted for the sake of clarity.

After the feature values and context node presence information are extracted as a result of the feature extraction process, a "property vector" can be generated 812 to hold such data. A property vector can be implemented as an array of objects, properties, aspects, or values that are of interest to the tester. A property vector thus is a general term for any array, set, or combination of such feature values that can be compared against an expected property vector, such as another set or array of values. The context and feature node objects typically will be DOM nodes in one embodiment, with the property values (e.g., feature values and context presence information) being simple strings, such as "MyChatApp" for the property name "widgetTitle." Thus, the send button will have text that will say "Send." Since this is a feature of interest in this example, it may be desirable to verify whether the text is displayed.

In one embodiment the values of the generated property vector are then serialized. It is not typically relevant to serialize a DOM node object because the object will have different memory addresses when a new page is loaded Even though the widget will generally have the same structure on the new page (subject to the design of the widget), the nodes of the page tree will have different addresses. The contents of the property vector, however, can easily be verified by serializing and/or persisting into a storage medium 814, such as a hard drive or other medium described elsewhere herein. There are several technologies that can be used to serialize a state of a widget. For example, JSON (JavaScript® Object Notation) can be used to convert the structure in the memory into a string. Later, that string can be reloaded and the memory structure recovered any time that test is performed. So a serialized state might thus be stored on a hard disk or other such memory storage location. In order to retrieve the serialized state, a routine such as a JSON de-serialize routine can be used to reproduce the same structure in memory. Upon loading the page, the de-serialized information can be used for validation purposes as discussed elsewhere herein.

As discussed above, the generation of a widget tree along with the feature extraction and generation of a property vector forms an extraction portion of the overall process for testing a widget in accordance with one embodiment. Once a property vector is obtained, that vector can be used to test the functionality of that widget for any of a number of different actions.

Figure 9:
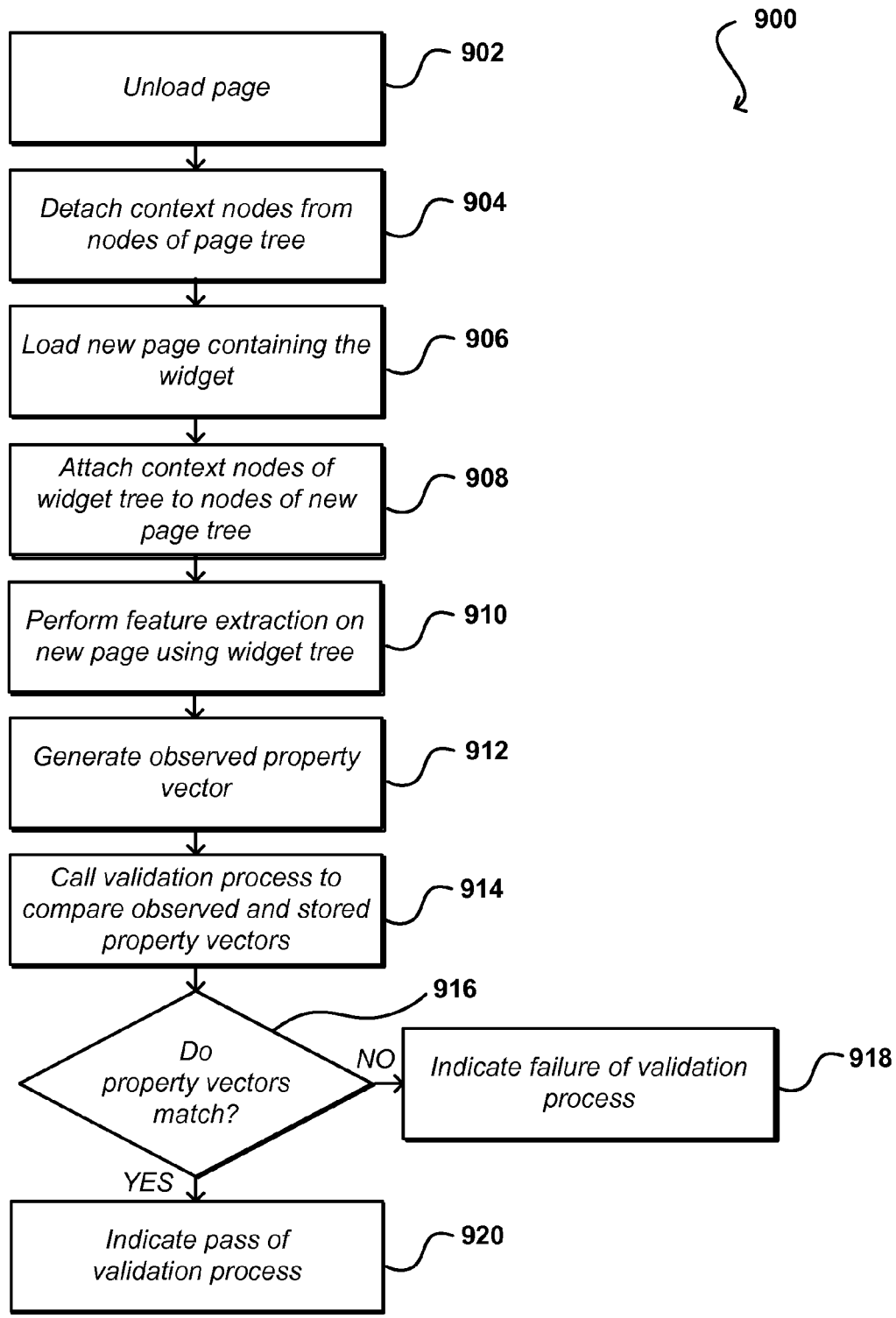
FIG. 9 illustrates a method of validating a widget after a page load that can be used in accordance with one embodiment.

As a first example, FIG. 9 illustrates an example of a method 900 for validating the widget upon a reloading or refreshing of a page containing a widget, or upon the loading of a different page containing the widget, in accordance with one embodiment. In the test case for such an action, the page containing the widget is unloaded 902 (if necessary) and the context nodes of the widget tree are detached from the page tree 904 using an appropriate detach procedure, which is typically as simple as assigning a null value where appropriate. The new page is loaded 906, which can be the same as, or different from, the previous page. The context nodes of the widget tree are also attached to the nodes of the new page tree 908, which may be the same or different from the previous page tree. The attached nodes act like reference points that allow the values of the identified widget features to be easily located and extracted from the new page tree, regardless of the overall structure of the new page tree. An appropriate extraction algorithm can be used to perform a feature extraction on the new page tree using the widget tree 910, and a new observed property vector, corresponding to the feature values and context node presence information for the new page, can be generated and/or initialized 912.

If the previous or existing property vector is not stored in local memory, the property vector can be retrieved, de-serialized, or otherwise extracted from storage. Once the observed property vector and the existing property vector are in memory, a validation process can be called to compare the observed and the existing property vectors 914. The process makes a determination as to whether the vectors match 916. It should be noted that the validation process could be as simple as a string comparison, but typically involves more logic, depending upon the sophistication level of the widget. If the vectors match, the process indicates a passing of the validation process for the functionality of the widget 920. If the vectors do not match, the process indicates a validation failure 918. The notification or indication can be accomplished using any appropriate mechanism, such as a screen display, pop-up message, email message, pager message, etc. The observed values of the new page are passed through the attach and extraction routine described earlier, as the DOM tree already contains the observed values and the new property vector can be easily initialized from there. The verification logic compares the vectors, and also can contain business logic to compensate for a state of the widget, as will be discussed later herein. A verification process thus typically will contain simple logic such as "this should not be null", and can contain a binary value and a reference to an object, for example. The feature values on the new page thus are either as expected or not.

Figure 10:
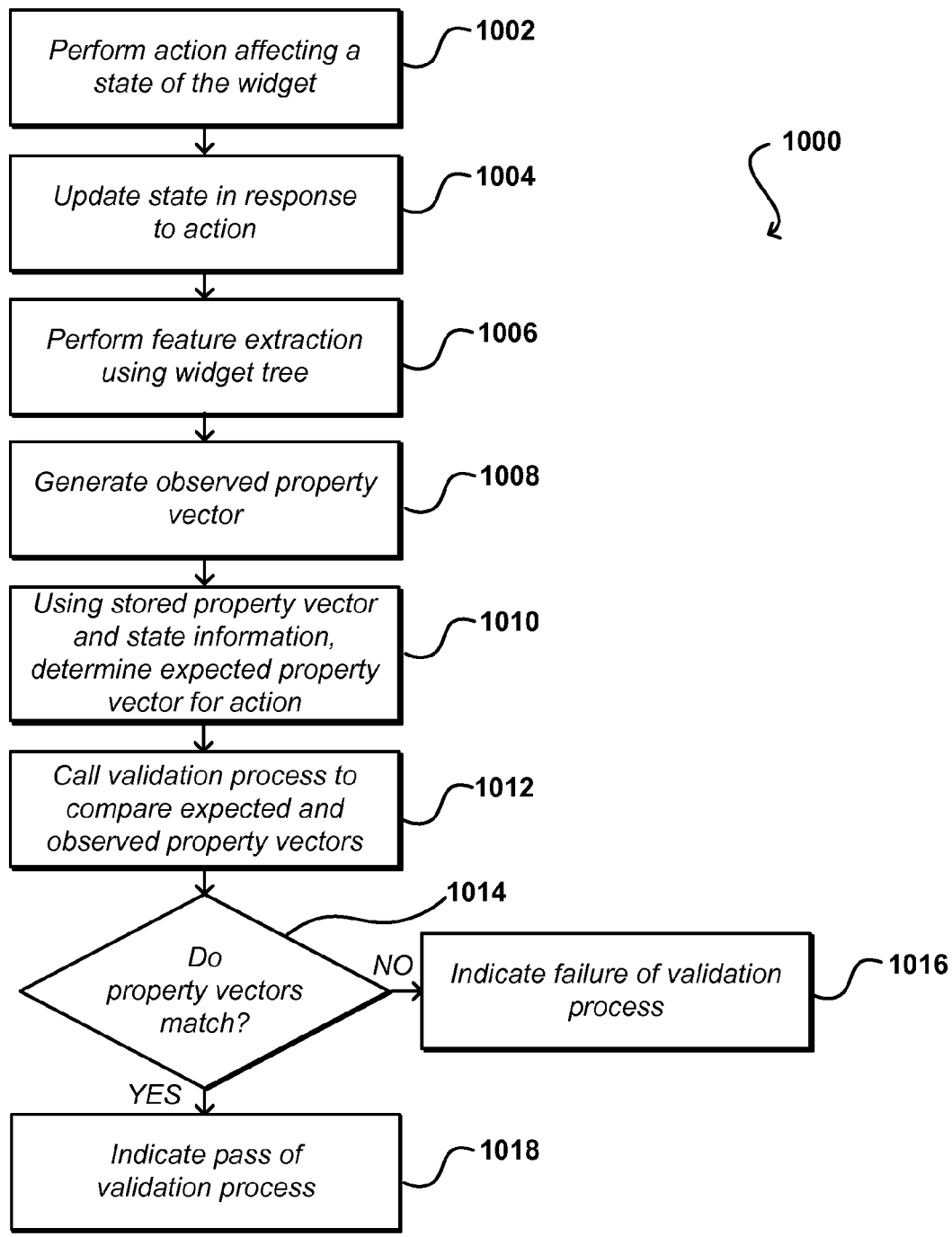
FIG. 10 illustrates a method of validating a widget after a user action that can be used in accordance with one embodiment.

FIG. 10 illustrates a method 1000 for another example, wherein a tester wishes to test the functionality of a widget in response to a particular action. As discussed above, this can include any appropriate action, such as selecting or moving a widget, submitting information, resizing a window, opening a new window, deleting an item, etc. In such a situation, the tester can develop a test automation in which the page is loaded and an existing property vector created as discussed above. After the property vector is created and stored in at least local memory, and the context nodes of the widget tree are attached to the nodes of the page tree, the determined action is performed 1002. In the case of the chat widget, for example, this can involve the tester submitting text in the chat field and selecting the submit button. The tester then would like to determine whether the widget updates correctly, such as to display the submitted text in the chat history field.

In response to the action being performed, the state of the test automation will be updated to reflect the submission and the updated chat history 1004. A state machine can be used that captures the core business logic for the widget, such that when actions are issued to the widget the resulting changes in the internal state will be captured by the state machine. The state machine can be a separate component of the testing framework, for example, and can be implemented in various ways, such as a series of "if . . . then . . . else . . . " statements as known in the art. The tester can define the logic of the state machine, and there also can be an amount of machine learning. Since the tester has some basic behavior in mind through a provided technical specification of the widget, the logic can be hard coded in at least one embodiment. There are a number of test cases in a test plan that can be automated, which in some embodiments can be coded and then run to check the functionality.

After the action has been performed, the DOM tree for the page will reflect any new or updated values or context node presence information resulting from the action. Accordingly, a feature extraction procedure can be run to extract the new property values using the nodes of the attached widget tree as points of reference 1006. Using the new extracted property values, a new observed property vector is generated 1008 that reflects the property values as a result of the action.

An expected property vector generation procedure can be used that takes as input the existing property vector, including feature values and context node presence information from before the action was performed, and the current state information reflecting the action. By applying the updated state information to the existing property vector, and by applying appropriate business logic, the procedure is able to generate expected feature values, or values that would be expected for the features as a result of the action according to the business logic. Using these expected values, the procedure is able to generate an expected property vector 1010, which represents how the observed property vector should look if the widget is performing as intended.

Once the expected property vector is obtained, a validation process is called that compares the expected property vector with the observed property vector 1012. The validation process from this point forward is similar to what was described above, such as where the validation process determines whether the property vectors match 1014, and if so, the process indicates that the widget passed validation 1018, and if not, the process indicates failure of the validation process 1016. As discussed above, such a notification can take any appropriate form, such as a popup message, entry in a test report, or email message.

As discussed above, in such a situation a state machine can manage the internal state, reflecting the current state of the widget and updating in response to various actions. The state machine can include code running on the application or testing server, for example. Validations then utilize the most recent state of the widget according to the state machine. The state machine can include various state variables that store the state of various aspects of the widget, which can be used with the business logic to determine the expected values. These expected values are then effectively validated against the observed values in the DOM tree, such as by comparing property vectors as discussed above. In this way the test does not need to be structured in an ad hoc fashion as in prior approaches, such as by using a series of explicit statements, etc. Instead, the approach effectively builds a prototype for the widget, which mirrors or behaves exactly as a widget behaves. This is the idealized widget that the tester has in mind, but without the user interface. The idealized widget in this embodiment only has state information, the property vector, and pointers to the DOM for the real widget. A tester then can test on the idealized widget, update internal state, etc., so when a validation process is called at any point the state machine will contain the current state. The validation logic then can simply refer to the state variables that are updated by the state machine, and perform the validation accordingly. The validation logic thus can include simple assertions, such as "if the widget is in this state then I should see this" but "if the widget is in that state, then I should see that". The state machine, however, controls the state transitions.

Because a page can contain many widgets, a single action such as a window resize or font change might affect multiple widgets, and thus result in a change in their internal states. Even though the validation process can easily validate each of these widgets using the existing property vectors and state information, it can be preferable in many circumstances to validate the functionality of all these widgets in response to a single action. Accordingly, it would be desirable to be able to make a single call or execute a single procedure to test any or all of the affected widgets on a page. The use of a widget tree for each widget can be particularly useful in such a situation, as an action such as a resize of a window can cause widgets to change position with respect to each other, such as for one widget to shift to under another widget, which can cause the widget to be connected to a different location in the page structure, and/or a different location in the hierarchy.

Figure 11:
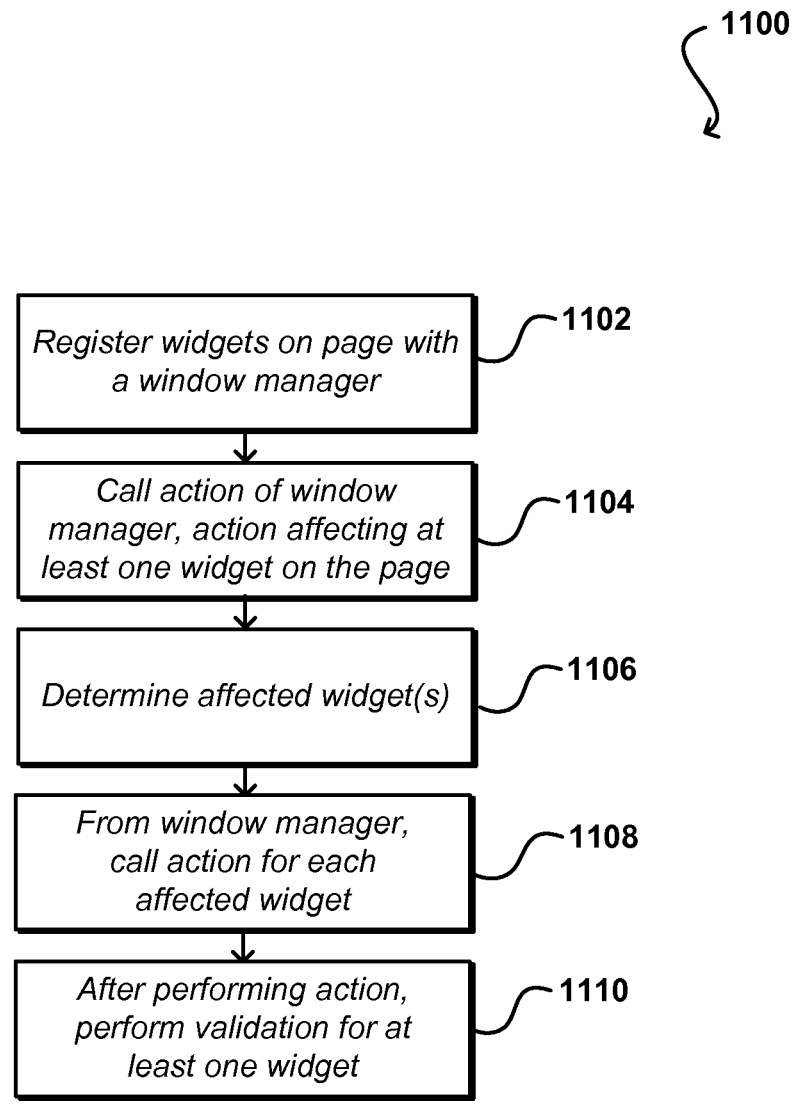
FIG. 11 illustrates a method of managing the validation of multiple widgets that can be used in accordance with one embodiment.

A method 1100 in accordance with one embodiment, such as is illustrated in FIG. 11, utilizes what will be referred to herein as a "window manager," although it should be understood that the term "window" is merely exemplary, and is used for purposes of explanation, as such a manager can manage widgets, modules, or code on any appropriate display or interface. A window manager class, module, application or object might manage all widgets, modules, or code portions that are associated with such an interface. A window manager in one embodiment is used to handle any page-wide actions, and notify any constituent widgets on the page that are to be tested. A window manager can also be viewed as the outermost or parent widget that controls all the widgets on a page.

In one embodiment utilizing a window manager, a test automation can register the widgets on the page that are of interest for testing purposes with the window manager 1102. It should be noted that in this instance registration is simply pushing the reference to a widget object (the object the test automation instantiates) to an array data structure, maintained by the window manager. Instead of having to make several calls for an action that affects multiple widgets on a page, in order to test each affected widget, a tester can make a call into the window manager for the action 1104. The window manager is able to determine which of the registered widgets are affected by the action 1106, and is able to make a call for the action to each affected and registered widget 1108. For example, the window manager can signal to each affected widget that a window resize action occurred, by calling their action handlers. This call can result in each widget updating the respective state in response to that action. After the state has been updated, validation can be performed for any or all of the affected widgets by comparing the observed property vectors to the expected property vectors as discussed above 1110.

As discussed above, a tester can create a workflow for the testing of a widget. For a dynamic, interactive widget such as a chat application, the corresponding DOM Tree typically will not remain static. Upon user action, the structure and/or the values of the DOM tree may get updated. A user action can cause an inline or dynamic update (e.g., through Ajax) or a page load, for example. In any case, the result of the feature extraction before an action will be invalid, or at least will likely not represent the current values, after the action is carried out. The property vector that is held in memory during test automation execution thus can be viewed as part of internal state. The discrepancy exists after the user action occurs, as the internal state becomes out of sync with the observed state, which is the perceived behavior of the application under test (AUT). The observed state is a direct result of widget behavior, in response to user and/or environmental actions. The observed state can be obtained through the feature extraction method described earlier. The expected state, on the other hand, is the direct result of the technical specification of a given widget, for example. In formal terms, testers implement test automation with the expected behavior in mind. They encode these expectations in their design of the test automation, and compare the expected state against the observed state of the widget. Test automation is, in a way, idealizing the widget behavior. Any discrepancy translates into a failure, a software bug, etc. In order to encode the aspects of widget behavior in test automation, the expected state is composed of a modified property vector and any internal state that cannot be captured within the property vector.

In addition to feature extraction, various processes may be included in a workflow that can be used with a testing pattern to handle a wide variety of use case scenarios. For example, an attachment process can be used to extract the appropriate nodes from the DOM tree for a current page, so as to assign the memory addresses of DOM Nodes to the ContextNodeSpecHash keys described above. An "InitializeFeatureVectorFromDOM" or similar process can be used to extract the features from the DOM tree of the current page, so as to assign feature values to the FeatureSpecHash keys, given that ContextNodeSpecHash has context nodes already initialized. A DetachContextNodesfromDOM or similar process can be used to reset the context nodes in ContextNodeSpecHash, so that the context nodes no longer point to the DOM nodes for the page.

As discussed above, a state machine can be used which can be considered an implementation of the technical specification for a given widget. The state machine defines behavior(s) in response to action(s). A state machine can be used to manipulate internal state variables, as well as the expected property vector in some embodiments. An action handler process can exist for each possible action that could be performed on a widget. Optionally, the code to simulate user actions on the target page could be placed in the action handler, such that invocation of an action handler routine will not only update the internal state of test automation, but also will apply the action on the target page. A validation process can be performed after each action, such as to report to the tester whether the widget has performed, behaved, and/or responded as expected. A transform procedure can be a special case of an action handler, in a way that the process usually performs geometric transformations on the expected state, to match a transformed version of a widget. An example would be a mini-chat widget that has mostly the same functionality as a chat widget, but is a shrunken version of the full widget in order to fit into smaller spaces on the interface. Another such process is a RegisterSubWidgets or similar process, wherein any dynamic portion or aspect of a widget can be abstracted into a different widget, which is managed by this outer widget. Such a process will be elaborated later herein.

In order to more fully explain the benefits of a test automation that can be implemented in accordance with one embodiment, a number of use cases will be described. In a first use case, the original and re-factored versions of the widgets are scraped and compared. Oftentimes the code for a Web application is re-factored, such as to optimize for performance, without any significant behavioral change. In such cases, the old version can simply be compared with the new version, and verification can be done to determine whether the versions are identical. Such testing could be streamlined if all features for both versions of the widget are extracted and then simply compared to each other one-by-one. This is a basic application of feature extraction, which in essence only requires the context node extraction, feature extraction, and validation processes and nothing else. In such a case, the workflow involves loading a page with an old version of the widget, attaching nodes to the page tree structure, and thus generating the widget tree. The property vector then is extracted for the old widget, and a new page is loaded with the new version of the widget. The nodes are attached to the page tree structure, thus generating the widget tree. A new property vector is extracted and determined for the new widget, and the property vectors for old and new widgets are compared in order to report whether the validation passed or failed.

In another use case example, user actions can be simulated on a static widget without JavaScript® support. In order to test a Web application, the tester has to have access to the Web page. There are different ways to access a Web page, such as through a programming language with DOM parsing capabilities (e.g., WWW::Mechanize Perl module) or through a tool that provides access to the browser's DOM Tree (e.g., OpenQA Selenium). The former approach provides little or no JavaScript® support, while the latter approach fully utilizes the JavaScript® engine of the browser (e.g., Microsoft® Internet Explorer or Mozilla® Firefox). If the Web application has no JavaScript®-dependent functionality, it is often times much quicker to implement test automation in a non-JavaScript® environment. In such cases, any user action will generate a page (re-)load, and the new state of the widget will be available thereafter. This is also a relatively trivial use case for a test automation written in accordance with various embodiments, as it could be automated with relatively little hassle. An example workflow for such a use case involves loading a new page containing the widget, initializing the expected state for the widget, and generating an expected property vector. The nodes are attached to the page tree structure, and the widget tree is generated. The observed property vector is generated for the widget, which is compared against the expected property vector. To carry out a user action, such as clicking 'Send' on a chat window, a corresponding action handler is called, which performs the click that triggers a page load. The action handler also updates the internal state of test automation to reflect the new expected property vector. The nodes are then detached from the page tree structure, as the old page tree will be purged from the computer memory, invalidating the information contained therein. A new page is loaded that contains the widget possibly in its new state (e.g., the new message is appended to the chat history). The nodes are attached to the page tree, and the new widget tree is generated. A new observed property vector is extracted for the widget, which overwrites the previously observed property vector. The expected and observed property vectors are compared and the results are reported.

In another example use case, user actions can be simulated on a browser with JavaScript® support (e.g., Dynamic update) for a tab-less Chat Application with a fixed-size Chat Window. In a JavaScript®-enabled scenario in which the widget has JavaScript® components that can update the page DOM structure without loading a new page, the workflow is very similar to the one described immediately above. However, in this scenario it is assumed that the context nodes are static but the features are dynamic. For example, the chat history can be implemented with a static TEXTAREA field, and the incoming chat messages (features) simply update the value inside this node. There is also no tabbing functionality, such that there is no change in the view, except the incoming messages. In such a scenario, it is sufficient to only repopulate the property vector. In the workflow, a new page containing the widget is loaded, the expected state for the widget is initialized, and the expected property vector is generated. The nodes are attached to the page tree structure, generating the widget tree. The observed property vector is extracted and generated for the widget. The observed property vector then is compared against the expected property vector. To carry out the user action (e.g., clicking 'Send' on a chat window), the corresponding action handler is called. The action handler performs the click, which triggers an event handler implemented as part of the widget. The action handler also updates the internal state of test automation to reflect the new expected property vector. The chat history field is dynamically updated, without leaving the page and without invalidating the nodes. A new property vector is extracted for the widget via the existing context nodes, and a new observed property vector is generated that replaces or overwrites the previous observed vector. The existing and new vectors are compared and the result of the validation is reported.

In another example use case, user actions are simulated on a browser with JavaScript® support (dynamic update) on a tabbing enabled Chat Window. In this relatively complex case, the chat widget is assumed to be a more enhanced version than the ones described above. The widget will have a dynamically growing chat history section and a tab support to switch between chat sessions, each with a different chat history. Such complex applications are not uncommon today. A framework in accordance with various embodiments can handle such situations by intelligently designing the state machine and action handlers. However, having different chat sessions will pose a big challenge in current design, since the state information will now comprise a set of property vectors, one for each chat session. This could as well be handled by using data structures such as arrays or matrices, but would not be efficient. A suggested approach is to abstract out any dynamic aspect of a widget into a sub-widget (e.g., a Chat-Session widget to represent tabs) for easy management. In the same way the chat widget is designed, this chat session widget will have the same set of processes to extract features, keep track of internal state information, and perform other such functions. The chat widget in this example will also be responsible for managing the chat session widgets.

An example of a workflow for such a use case is as follows. A new page is loaded that contains the widget. The sub-widgets are registered with the widget similar to methods for registering page widgets with a window manager as explained above. The expected state for the widget is initialized, and the expected property vector generated. Any sub-widget can be signaled in turn to generate property vectors for those portions of the widget. In an example chat widget case, the only sub-widget to initialize would be the primary tab. The context nodes are attached to the page tree and the widget tree structure is generated. In turn, any sub-widget is called to attach their context nodes to page DOM structure. The observed property vector for the widget is extracted and generated. Any sub-widget is also called to generate their respective observed property vectors. The observed and expected property vectors are then compared. In turn, any sub-widget is called to perform that side of comparison. To carry out the user action (e.g., click 'Send' on a chat window), the corresponding action handler is called, which performs the click and thus triggers an event handler implemented as part of the widget. The action handler also updates the internal state to reflect the new expected property vector. If any of the sub-widgets are impacted by the said action, the affected sub-widgets will replicate the action on their side, and the process continues as described above.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java® servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers are remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of validating a widget on a Web page, comprising:
   generating a widget tree containing a hierarchy of context nodes and feature nodes, each of the context nodes and feature nodes corresponding to a feature under validation for an identified widget, the widget tree further corresponding to a subset of a first page tree structure for a first Web page;
   attaching the context nodes of the widget tree to nodes of the first page tree structure;
   performing a first feature extraction to obtain a first property value for each feature of interest corresponding to a context node or feature node in the widget tree, each first property value being a feature value or context node presence information;

generating a first property vector including each first property value for the widget;
loading and de-serializing a serialized expected property vector into an expected property vector; and
comparing the first and expected property vectors to validate a functionality of the widget, wherein a functionality of the widget is validated if the first property vector matches the expected property vector.

2. A method according to claim 1, further comprising:
attaching the context nodes of the widget tree to nodes of a second page tree structure for a second Web page containing the widget;
performing a feature extraction to obtain second property values for each feature under validation corresponding to a context node or feature node in the widget tree;
generating a second property vector including each second property value for the widget; and
serializing the second property vector into the serialized expected property vector.

3. A method according to claim 2, further comprising:
detaching the context nodes from the first page tree structure and unloading the first Web page; and
loading the second Web page before attaching the context nodes of the widget tree to nodes of the second page tree structure.

4. A method according to claim 1, further comprising:
generating an electronic notification indicating whether the functionality of the widget is validated.

5. A method for acquiring a property vector for a code module of an application page, comprising:
registering one or more code modules with a window manager;
receiving, by the window manager, a request to perform an action;
performing, by the window manager, the action for each code module that is affected by the action and registered with the window manager;
for each registered code module:
identifying a plurality of features of interest for the code module, the application page including a plurality of code modules and having associated therewith a page tree structure;
generating a module tree containing a hierarchy of context nodes and feature nodes, each of the context nodes and feature nodes corresponding to one of the features of interest for the code module, the module tree further corresponding to a subset of the page tree structure;
attaching the context nodes of the module tree to nodes of the page tree structure;
performing a feature extraction to obtain a property value for each feature of interest corresponding to a context node or feature node in the module tree, each property value being one of a feature value and context node presence information; and
generating a first property vector including each of the obtained property values for the code module;
after performing the action that affects the code module:
performing a feature extraction to obtain new property values for each feature of interest corresponding to a context node or feature node in the module tree;
generating a second property vector including each new property value for the code module; and
comparing the first and second property vectors, wherein a functionality of the code module is validated if the first and second property vectors match.

6. A method according to claim 5, wherein generating a first property vector further comprises serializing the first property vector and wherein comparing the first and second property vectors further comprise loading and de-serializing the first property vector.

7. A method according to claim 5, further comprising:
storing the first property vector to a storage medium,
wherein subsequent loading of the code module in the application page or a separate page is able to utilize the property values of the first property vector to determine a present state of the code module.

8. A method according to claim 5, further comprising:
generating a third property vector after the subsequent loading of the code module and comparing the third property vector with the first property vector in order to validate a functionality of the code module.

9. A method according to claim 8, further comprising:
serializing the second property vector.

10. A method according to claim 9, further comprising:
loading and de-serializing the serialized second property vector before the step of comparing the first and second property vectors.

11. A method according to claim 5, further comprising:
detaching the context nodes from the nodes of the page tree structure upon an unloading of the application page.

12. A method according to claim 5, further comprising:
after performing the action that affects the code module, generating an electronic notification indicating whether the functionality of the code module is validated.

13. A method according to claim 5, wherein:
performing an action includes performing a transformation action for the code module.

14. A method according to claim 5, wherein the module tree structure is a DOM tree, and further comprising:
analyzing the DOM tree to attach the context nodes to the nodes of the DOM tree.

15. A method of validating a code module, comprising:
loading a page containing the code module of interest;
attaching context nodes of a module tree for the code module to nodes of a page tree structure for the page, the module tree being a subset of the page tree structure;
performing a feature extraction to obtain current property values for each feature of interest corresponding to an attached context node or an extracted feature node in the module tree, each property value corresponding to a feature value or context node presence information;
generating a current property vector including each current property value for the code module; and
comparing the current property vector with a previous property vector representing prior property values for the code module in order to validate a functionality of the code module.

16. A method according to claim 15, further comprising:
performing an action on the code module,
wherein the previous property vector represents a state of the code module before the performance of the action, and the current property vector represents a state of the code module after the performance of the action.

17. A method according to claim 16, wherein comparing the current property vector with a previous property vector further comprises loading and de-serializing the previous property vector such that the current property vector and previous property vector may be compared.

18. A method to claim 15, further comprising:
updating the previous property vector to reflect an expected impact of the action using to a finite state machine operable to model a change in state in response to the action, before comparing the previous property vector with the current property vector.

19. A method according to claim 15, further comprising: loading an updated version of the page,
wherein the first property vector represents a state of the code module before the loading of the updated version, and the second property vector represents a state of the code module after the loading of the updated version.

\* \* \* \* \*